United States Patent [19]

Kosako

[11] Patent Number: 5,317,354
[45] Date of Patent: May 31, 1994

[54] REMOTE CONTROL FOR A CAMERA HAVING AN OPTICAL FIBER

[75] Inventor: Kosei Kosako, Tokyo, Japan

[73] Assignee: Asahi Kogaku Kogyo Kabushiki Kaisha, Tokyo, Japan

[21] Appl. No.: 15,834

[22] Filed: Feb. 10, 1993

[30] Foreign Application Priority Data

Feb. 17, 1992 [JP] Japan .............................. 4-006151[U]

[51] Int. Cl.⁵ .............................................. G03B 17/38
[52] U.S. Cl. .................................................... 354/266
[58] Field of Search ........................................... 354/266

[56] References Cited

U.S. PATENT DOCUMENTS

| | | | |
|---|---|---|---|
| 4,864,340 | 9/1989 | Kaneko | 354/266 |
| 4,937,604 | 6/1990 | Yoshida et al. | 354/266 |
| 5,014,080 | 5/1991 | Miyadera | 354/266 X |
| 5,072,248 | 12/1991 | Kakiuchi | 354/266 |

Primary Examiner—M. L. Gellner
Assistant Examiner—J. K. Han
Attorney, Agent, or Firm—Sandler Greenblum & Bernstein

[57] ABSTRACT

A remote control apparatus of a camera including a remote control signal receiving element and a remote control mode indicating element provided in the camera body, a plurality of indicating windows on the sides of the camera body, and an optical connector for optically connecting the remote control signal receiving element and remote control mode indicating element to the indicating windows.

6 Claims, 3 Drawing Sheets

REMOTE CONTROL FOR A CAMERA HAVING AN OPTICAL FIBER

BACKGROUND OF THE INVENTION

1. Field of the Invention

The present invention relates to a remote control apparatus of a camera.

This application is related to the commonly assigned application U.S. Ser. No. 07/790,352, filed Nov. 12, 1992, the disclosure of which is expressly incorporated by reference herein.

2. Description of Related Art

In a known camera, a remote control apparatus has been provided in which an operation, such as a shutter releasing operation, etc., can be controlled at a remote distance. More recently, a remote control apparatus has been developed in which the remote control operation can be effected, not only from the front of the camera, but also from behind the camera (i.e. a two-directional remote control apparatus).

It is further known to provide a light emitter, such as a light emitting diode, which emits visible light to indicate to the photographer that the camera is in a remote control mode and that the remote control operation can be carried out.

SUMMARY OF THE INVENTION

The primary object of the present invention is to simplify the known two-directional remote control apparatus of a camera. The object is achieved by providing less complicated mechanisms for indication of the remote control mode and signal transmission of remote control signals, while maintaining a remote control apparatus that can be easily effected in two directions and in which the indication of the remote control mode can be viewed from the two directions.

The basic concept of the present invention resides in the provision of a single light receiving element for receiving remote control signals incident on the camera from two different directions, and a single indicating element for indicating the activation of the remote control made in two different directions. Furthermore, a plurality of separate windows are provided for receiving the remote control signals and for indicating activation of the remote control mode.

The present invention provides a remote control apparatus of a camera, including a remote control transmitter which emits remote control signal light, and a light receiver provided in a camera body casing which receives the remote control signal light emitted from the remote control transmitter. A shutter of the camera body can be released in response to the remote control signal light received by the light receiver. The remote control apparatus comprises a light emitter which is provided adjacent to the light receiver to emit light to indicate activation of a remote control mode in which a picture can be taken by the remote control apparatus, a first transparent portion provided on one side of the camera body casing through which light can be transmitted, a second transparent portion provided on the opposite side of the camera body through which light can be transmitted, and an optical fiber, one end of which faces the light emitter and the light receiver, the other end of which faces either the first or second transparent portion. Preferably, the light emitter and the light receiver face the other of either the first or second transparent portions.

The optical fiber extends between the first or second transparent portion and the light receiver and emitter.

It is preferable that the camera body have a recess in which the remote control transmitter can be accommodated, and a means for setting the remote control mode when the remote control transmitter is detached from the recess of the camera body.

In a preferred embodiment, the light emitter and the light receiver are located within a light receiving angle of the optical fiber.

According to another aspect of the present invention, a remote control apparatus of a camera comprises a single remote control signal receiving element and a single remote control mode indicating element, provided in the camera body, a plurality of indicating windows on the surface of the camera body, and a means for optically connecting the remote control signal receiving element and remote control mode indicating element to the indicating windows.

The optical connecting means can be comprised of an optical fiber or a close arrangement of the remote control signal receiving element and remote control mode indicating element and the indicating windows.

BRIEF DESCRIPTION OF THE DRAWINGS

The invention will be described below in detail with reference to the accompanying drawings, in which.

DESCRIPTION OF THE PREFERRED EMBODIMENT

Figure 1:
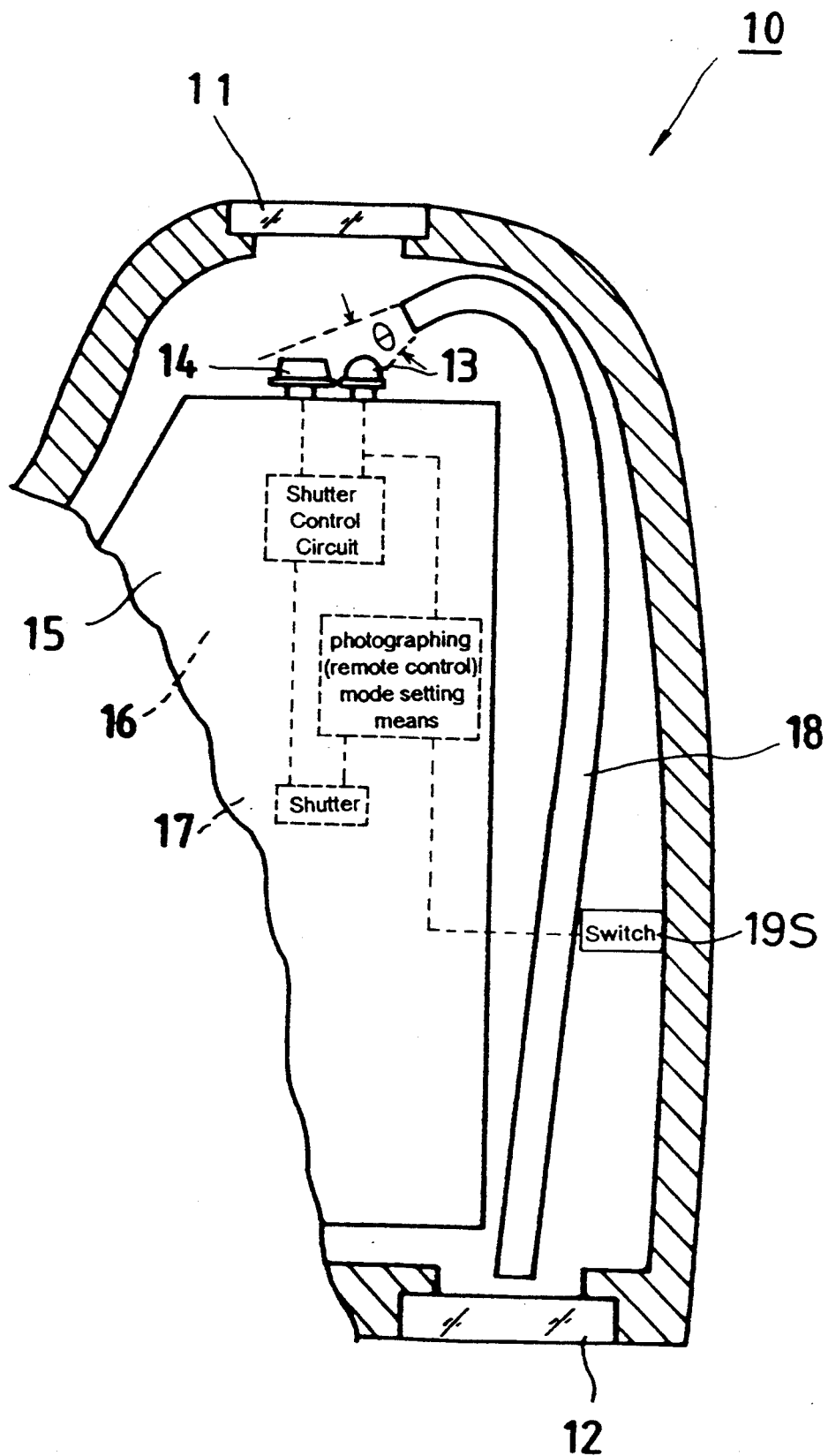
FIG. 1 is a partial sectional view of a remote control apparatus of a camera along the line A—A in FIGS. 2 and 3, according to the present invention.
Figure 2:
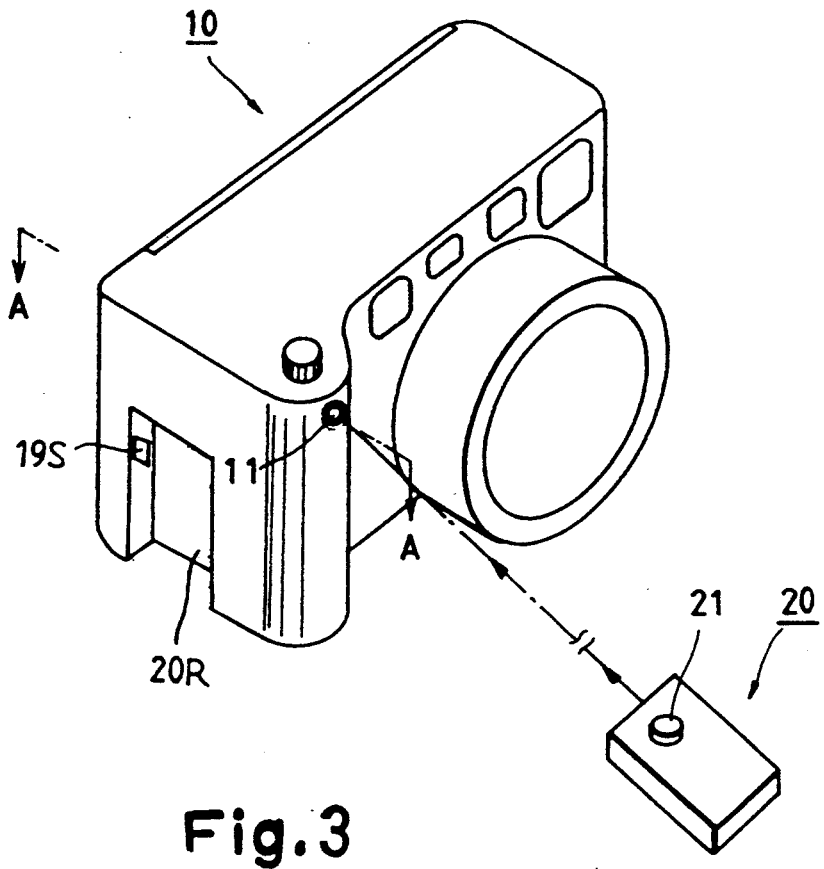
FIG. 2 is a perspective view of a camera body and a remote control transmitter of a camera shown in FIG. 1.
Figure 3:
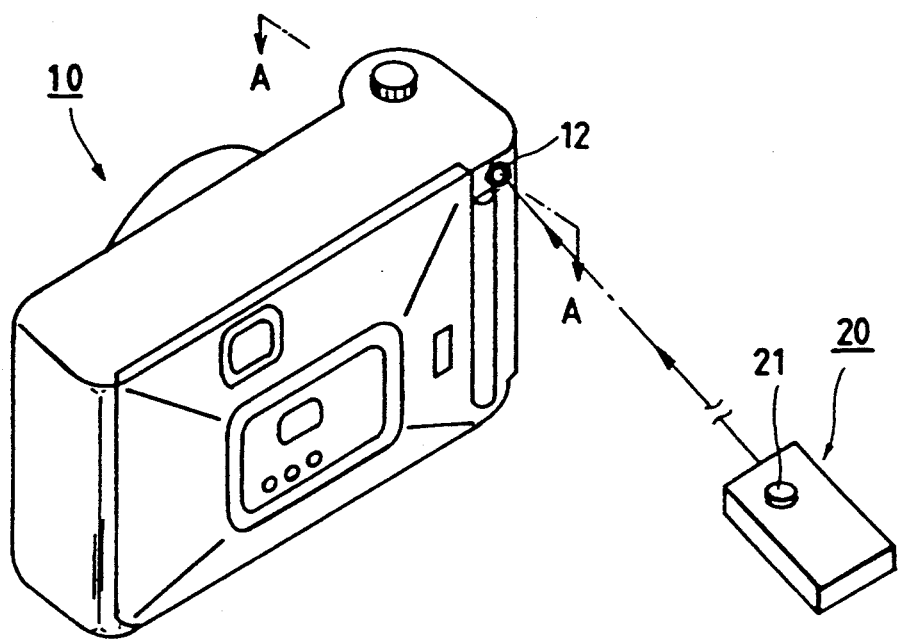
FIG. 3 is a perspective view of a camera body and a remote control transmitter of a camera shown in FIG. 1, viewed from a different direction than FIG. 2; and, FIG. 4 shows another embodiment of a remote control apparatus, according to the present invention.

In FIGS. 1 through 3, which show an embodiment of a remote control apparatus of a camera according to the present invention, a shutter mechanism of a camera body 10 can be released in response to remote control infrared light emitted from a remote control transmitter 20 when a photographer pushes a transmitter button 21 of the remote control transmitter 20. The camera body 10 has a recess 20R (FIG. 2) in which the remote control transmitter 20 can be accommodated. A detecting switch 19S is provided on a side wall of the recess 20R to detect the presence of the remote control transmitter 20. Namely, when the remote control transmitter 20 is positioned in the recess 20R, the detecting switch 19S is turned OFF. Accordingly, a normal photographing mode is set by a photographing mode setting means 19. Conversely, when the remote control transmitter 20 is detached from the recess 20R, the detecting switch 19S is turned ON, and a remote control mode is set by the photographing mode setting means 19.

Transparent windows 11 and 12 are provided on front and rear walls of the camera body 10. Infrared light and visible light can be transmitted through the windows. A light emitting element (light emitter) 13 and a light receiving element (light receiver) 14 are provided in the camera body 10. Light emitting element 13 and light receiving element 14 are located side by side opposite the front transparent window 11. The light emitting element 13 emits light or flickers when the remote control mode has been selected by the photographing mode setting means 19, alerting the photographer that a picture can be taken using the remote control. The light receiving element 14 receives the remote control infrared light emitted from the remote control transmitter 20. The shutter of the camera body 10 is released upon receipt of the remote control infrared light.

The light emitting element 13 and the light receiving element 14 are connected to a shutter control circuit 16. The shutter control circuit 16 controls the emission of the light emitting element 13 and the shutter release operation in accordance with the remote control infrared light received by the light receiving element 14. The light emitting element 13 and the light receiving element 14 are secured to a front wall of a stationary portion 15 provided in the camera body 10.

An optical fiber 18 is provided in the camera body 10. One end of the optical fiber 18 is located in the vicinity of the rear transparent window 12. The other end is located in the vicinity of the adjacent light emitting and receiving elements 13 and 14. The optical fiber 18 is located in the camera body 10 in a manner so as not to intercept the remote control signal (i.e., remote control infrared light) to be received by the light receiving element 14 through the front transparent window 11 or light emitted by the light emitting element 13 to be received by a photographer. Namely, light emitted by the light emitting element 13 can be viewed through the front transparent window 11 without being intercepted by the optical fiber 18. Furthermore, a light emitting and receiving angle $\theta$ of the optical fiber 18 is such that both the light emitting element 13 and the light receiving element 14 are located within the light emitting and receiving angle $\theta$, as shown in FIG. 1.

When the remote control infrared light is emitted by the remote control transmitter 20 from the front side of the camera body 10, i.e., from the object side, the infrared light is received by the light receiving element 14 of the camera body through the front transparent window 11. On the other hand, when the remote control infrared light is emitted by the remote control transmitter 20 from the rear side of the camera body 10, the infrared light is received by the optical fiber 18 through the rear transparent window 12. The infrared light is transmitted through the optical fiber 18 and is received by the light receiving element 14. Thus, the photographer can actuate the remote control transmitter 20 on either side of the camera body 10.

Light emitted from the light receiving element 13 is partly transmitted through the front transparent window 11. Light dispersed from the light receiving element 13 is picked up by the optical fiber 18, transmitted therethrough, and dispersed outside through the rear transparent window 12. Consequently, a photographer can confirm that the remote control mode, in which a picture can be taken by the remote control apparatus, has been selected in the camera body 10 from either the front or the rear of the camera body.

It is possible for the light emitting element 13 and the adjacent light receiving element 14 to be located on the rear wall of the stationary portion 15 in the vicinity of the transparent window 12 provided in the rear casing of the camera body 10, instead of the front wall of the stationary portion 15. In such an alternative, one end of the optical fiber 18 is located opposite the light emitting and receiving elements 13 and 14, and the other end is located opposite the front transparent window 11, provided in the front wall of the camera body 10.

Although the transparent windows 11 and 12 are provided in the front and rear walls of the camera body 10 in the illustrated embodiment, it is possible to provide them on walls of the camera body other than the front and rear walls.

Figure 4:
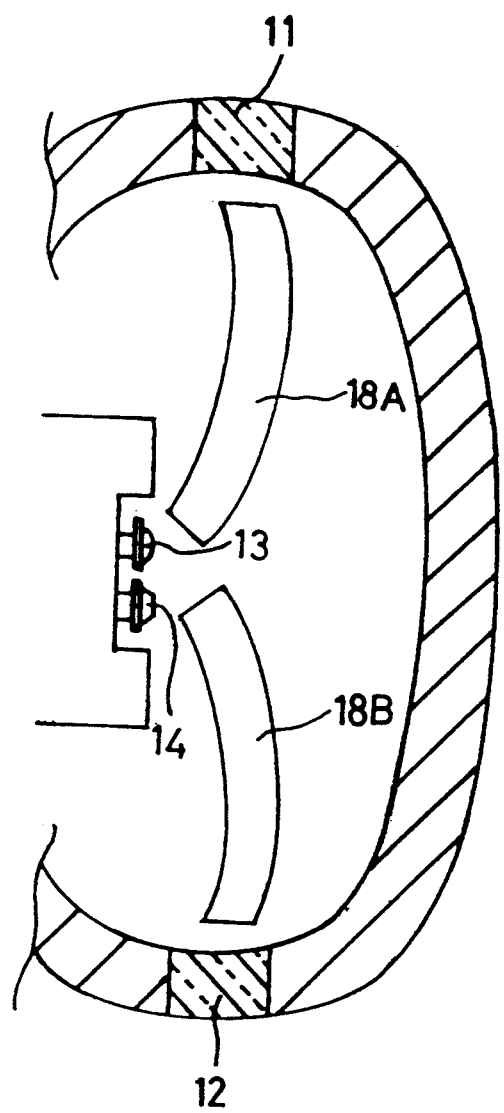

FIG. 4 shows another embodiment of the present invention in which separate optical elements 18A and 18B are provided to transmit light between the transparent portions 11 and 12, and the light emitting and receiving elements 13 and 14.

As can be seen from the above discussion, according to the present invention, not only can the remote control operation of the camera be carried out in different directions, but also the remote control mode, in which a picture can be taken by the remote control apparatus, can be indicated in different directions without increasing the number of the light emitting and receiving elements, thus resulting in the realization of a small and inexpensive camera having fewer camera components.

I claim:

1. A remote control apparatus for a camera including a remote control transmitter which emits a remote control signal light, and a light receiver provided in a camera body which receives the remote control signal light emitted from said remote control transmitter, wherein a shutter of said camera body can be released in response to the remote control signal light received by said light receiver, comprising:

a light emitter which is provided adjacent to said light receiver to emit light to indicate activation of a remote control mode in which a picture can be taken by said remote control apparatus;

a first transparent portion provided on a side of said camera body through which light can be transmitted;

a second transparent portion provided on another side of said camera body through which light can be transmitted; and an optical fiber having a first end and a second end, the first end facing said light emitter and said light receiver, the second end facing one of said first or said second transparent portion.

2. A remote control apparatus of a camera according to claim 1, wherein said light emitter and said light receiver face an other of said first or said second transparent portion.

3. A remote control apparatus of a camera according to claim 1, wherein said optical fiber extends between said first or second transparent portion and said light receiver and light emitter.

4. A remote control apparatus of a camera according to claim 1, wherein said camera body has a recess in which said remote control transmitter can be accommodated.

5. A remote control apparatus of a camera according to claim 4, wherein said camera body includes a means for setting a remote control mode when said remote control transmitter is detached from the recess of said camera body.

6. A remote control apparatus of a camera according to claim 1, wherein said light emitter and said light receiver are located within a light emitting and light receiving angle of the optical fiber.

* * * * *

UNITED STATES PATENT AND TRADEMARK OFFICE
CERTIFICATE OF CORRECTION

PATENT NO. : 5,317.354
DATED : May 31, 1994
INVENTOR(S) : Kosei KOSAKO

It is certified that error appears in the above-indentified patent and that said Letters Patent is hereby corrected as shown below:

At column 4, line 53 (claim 3, line 3) change "second" to ---said second---.
    At column 4, line 54 (claim 3, line 4) change "light" to ---said light---.
    At column 4, line 62 (claim 5, line 4) change "the" to ---said---.
    At column 4, line 67 (claim 6, line 4) change "the" to ---said---.

Signed and Sealed this

Fifth Day of September, 1995

*Attest:*

BRUCE LEHMAN

*Attesting Officer*     *Commissioner of Patents and Trademarks*